INVENTORS
Byron M. Bird.
Bertram D. Thomas.
John W. Rea.
BY
ATTORNEYS.

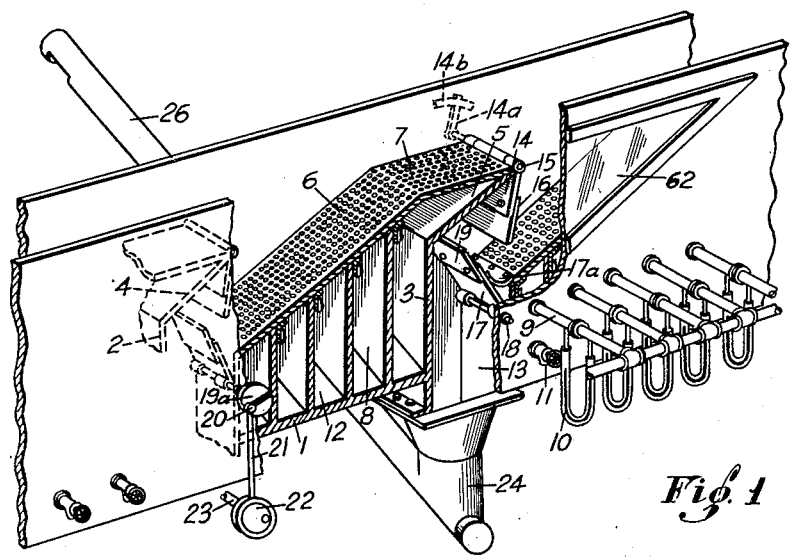
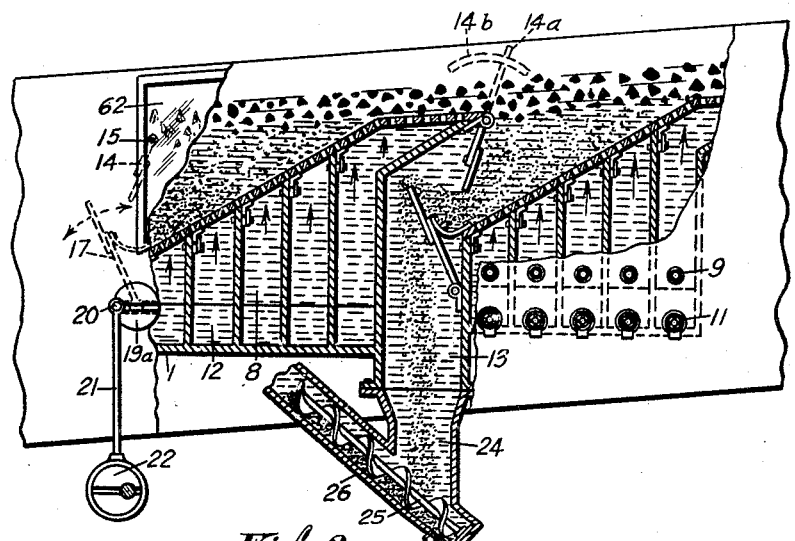

INVENTORS
Byron M. Bird.
Bertram D. Thomas.
John W. Rea.
BY
ATTORNEYS.

Patented Feb. 14, 1939

2,147,234

UNITED STATES PATENT OFFICE 2,147,234

LAUNDER APPARATUS FOR SEPARATING AND SORTING MATERIALS

Byron M. Bird and Bertram D. Thomas, Columbus, Ohio, and John W. Rea, Monessen, Pa., assignors to Battelle Memorial Institute, Columbus, Ohio, a corporation of Ohio Original application June 3, 1935, Serial No. 24,654, now Patent No. 2,099,226, dated November 16, 1937. Divided and this application October 13, 1936, Serial No. 105,404

3 Claims. (Cl. 209—155)

Our invention relates to a launder apparatus for separating and sorting materials. It has to do, particularly, with the separating and sorting of such materials as coal and ore, although it is not necessarily limited thereto.

The prior art practice in launder separations may be best illustrated by a brief description of one of the most widely used of these systems. In this system, water transports the material to be separated down troughs or launders which are sloped a few degrees from the horizontal. Pockets are provided in the bottom of the launder for the withdrawal of the materials depositing from the stream, and these pockets are spaced substantial distances apart so that relatively long areas of trough lie therebetween. Sometimes these pockets are provided with upward currents of water to modify the horizontal current stratification obtained between the pockets.

In the common practice with this prior art system applied to coal, the bulk of the materials of low specific gravity overflows as a final clean product at the end of the primary launder, while a product containing the materials of high specific gravity mixed with incompletely separated materials of low specific gravity is withdrawn through the pockets in the bottom of the launder. This bottom product is re-treated in another launder and a further proportion of materials of low specific gravity overflows the end of this second launder. The bottom product of high specific gravity withdrawn from this second launder through the pockets thereof, is submitted to further re-treatments in one or more additional launders until a final product of high specific gravity and of sufficient purity is obtained.

In addition to these re-treatments in a series of separate launders, it is customary to return the bottom products of one or more of the various launders either to the raw coal or to the feed to the respective launders. Usually about one ton of this circulating material is returned for each ton of new material washed. As a result of these numerous re-treatments and circulating loads, prior art launder systems have been very complicated, have used an unnecessary amount of power and water and have caused excessive breakage and attrition of the coal.

Our investigations indicate that these numerous re-treatments and circulating loads in the prior art are due to an improper understanding of the fundamental factors governing the deposition of materials from a horizontally flowing stream. This is particularly true where the materials are deposited while subjected to upward currents of liquid, though it is also true even where upward currents are not used. Since this improper understanding has led to the faulty methods of operation and apparatus found in the prior art, a brief discussion of some of these fundamental factors seems to be in order here.

It is first necessary to consider the meaning of the term "competent slope". This is the angle with respect to the horizontal assumed by the top of the bed in a stream carrying solid materials when neither erosion nor deposition is taking place. This angle depends upon certain variables such as the nature and quantity of the solids being transported, the velocity of the stream, the magnitude of upward currents if such are present, and the like. If, for any reason, the slope of the top surface of the bed of such stream is greater than competent slope, the stream will erode the bed until competent slope is attained. If, on the other hand, the slope of the top surface of the bed is less than this critical value, material will deposit until competent slope is reached.

The angle, with respect to the horizontal, which the top surface of the bed makes at any time during the process of building up to competent slope may be termed the "angle of deposition". Both the angle of deposition and its limiting value—competent slope, are important factors in determining the nature of the materials which deposit in the bed of a launder. Our investigations have indicated that the difference between the angle of deposition and competent slope determines to a considerable extent the quality of the materials which deposit. If, for example, in the cleaning of coal in horizontally flowing currents combined with properly regulated upward currents of liquid, the difference between the angle of deposition and competent slope is small enough, the materials deposited will consist substantially of materials of the highest specific gravity. On the other hand, if this difference is large, the percentage of materials of low specific gravity depositing is relatively great.

An important factor in controlling the angle of deposition in the pockets is a compact bed. This may be described as an extreme condition of crowding and hindered-settling. For one thing, such a bed is resistant to disturbances caused by the withdrawal of materials and to turbulence caused by the horizontal currents. Furthermore, a compact bed is important in excluding materials of low specific gravity. A loose bed will allow materials of low specific gravity to deposit in its interstices, whereas a compact bed is efficient in preventing such deposition.

Upward currents of liquid are likewise important in launder processes, more particularly in their uniformity and the way in which they are applied. The stratification of materials in a flowing mineral-laden stream and the type of material which deposits in the bed of such a stream may be greatly modified by the magnitude and distribution of the upward currents of liquid to which the bed and the stream are subjected and the control of these currents is essential to the best operation of a launder.

The velocity of the horizontally flowing currents also vitally affects the character of the material which deposits. For high efficiency, it is desirable to maintain this velocity below the values at which it induces turbulence in the pockets, while withdrawing materials therefrom.

An inspection of prior art launders indicates that none of these factors has been appreciated nor has any application of them been made in such a way as to obtain the improved separations that their proper use makes possible.

In the first place, the plane of deposition, usually the downstream side of the concave depression of the bed over the pockets, is disposed at a large angle with relation to competent slope. Consequently, a relatively large percentage of materials of low specific gravity is deposited in the pockets.

In the second place, the beds within the pockets of the prior art launders are not compact but are relatively loose. In some cases, this is due to the shape of the pockets. In some cases, it is due to currents of liquid that intermittently surge upwardly through the draws when they are opened to withdraw materials from the pockets. These upward currents, intended to wash out the materials of low specific gravity, serve unduly to loosen the bed. In other cases it is due to a rate of withdrawal so rapid as to undermine the bed and further to decrease the compactness thereof. In still other cases it is due to a method of withdrawal which momentarily permits a portion of the bed to fall freely from the pockets so that all compactness of the bed is lost.

In the third place, it is customary in the prior art when utilizing upward currents of liquid in the pockets, to space them substantial distances apart. This resolves itself into an attempt to bring about alternate horizontal current and vertical current stratification in a manner which is obviously impractical. In a mineral-laden stream traveling down a launder at a rate of several feet a second, material that has been stratified horizontally can not be restratified in the short interval of time consumed in its passage over a pocket. A change of stratification requires a substantial period of time, far greater than available during passage of the material-laden stream over a pocket. A further disadvantage of the substantial spacing of the pockets is that it renders necessary the use of undesirably long launders and expensive structures.

In the fourth place, because of the necessity of transporting circulating loads made up of a large proportion of materials of high specific gravity, prior art launders customarily use horizontal currents of excessive velocity. These cause turbulence in the pockets when concavities form in the surface thereof during the withdrawal of materials from the bottoms.

One object of our invention is to increase the efficiency of the primary separation so that fewer re-treatments are required and circulating loads may be eliminated or greatly reduced.

Another object of our invention is to provide a simple plant with a low installation cost and with a low operating cost.

Another object of our invention is to reduce breakage and attrition.

A further object of our invention is to effect a substantial saving in the amount of thickening and filtering to be done on the fine sizes in the washed coal.

Various other objects and advantages of this invention will appear as this description progresses.

Our method comprises the use of a launder of a certain structure and a mode of operation such that the fundamental principles of separation are effectively applied. The application of such principles involves the maintenance of cooperation of a number of factors which have been found to bring about a more complete separation.

One of the factors consists in the provision and maintenance of a compact bed in each of the launder draw pockets. Another factor consists in the maintenance of a slight difference between competent slope and plane of deposition. Another factor involves the use of controlled upward currents of liquid in the draw pockets and preferably throughout the launder, with these upward currents of such uniformity and such distribution that the compactness of the bed is not disturbed. Another factor involves the use of a relatively slow rate of withdrawal per unit of active bed surface so as to prevent undermining of the beds in the draw pockets. Still another feature involves the use of horizontal streams of liquid of relatively low velocity, so that the upper surfaces of the beds in the draw pockets are not disturbed by turbulence while deposition is taking place. The manner in which these factors are applied and made effective will now be set forth more in detail.

We have taken several steps to insure that a compact bed is maintained in the draw pockets of our launder. For one thing, we have provided draw pockets which are either specially wedge-shaped or which can be operated to develop wedge-shaped channels through which the refuse passes. These wedge-shaped channels serve to compact the beds within the pockets by their progressively decreasing cross sections. Then, we withdraw the refuse much more slowly per unit of depositing area than is customary in the prior art, so that the beds will not be undermined and loosened. This withdrawal is under positive control at all times and the refuse is never allowed to discharge freely from the pockets. At the same time, we use vertical currents in the pockets which are uniformly distributed and are of uniform upward velocity at all times.

Where it has been customary in the prior art to add so-called "push water" we have found it highly advantageous to keep the horizontal currents down to a minimum. For example, on ⅜" x 0" coal, we have found that about a 1:1 ratio of liquid to raw coal is desirable. With this low initial velocity, we keep turbulence and eddy currents down to a minimum.

We preferably dispose our launder at an angle approximating competent slope. In preferred form, we use a launder wherein the pockets are in substantially abutting relation, though this is not necessarily so. If any spaces are provided between pockets, we preferably permit deposition of thin beds in these spaces so as to prevent any tendency of the horizontal current liquids to cascade into the pockets and disturb the beds therein.

As a result of these various steps of our process, we provide and maintain beds within the pockets which, because of their inherent compactness, are highly efficient in excluding the deposition of materials of low specific gravity therein. This efficiency in excluding the deposition of materials of low specific gravity is further markedly accentuated by the upward currents of liquid in the pockets. These currents are not sufficient to detract from the compactness of the bed and are effective in preventing the deposition of the finer particles of low specific gravity. Because of our relatively slow rate of withdrawal and our compact beds, the angle between the plane of deposition and competent slope is maintained comparatively small, in consequence of which the proportion of material of low specific gravity tending to deposit in the bed is still further decreased.

The abutting relation of the pockets of our launder is a further factor in producing the high efficiency of our method as a whole. However, as indicated above, our method has many important novel features which may be practiced effectively in a launder wherein the pockets are spaced substantial distances apart. It might be said, however, that, if the pockets of our launder are spaced substantial distances apart, we preferably use upward currents of liquid in those spaces which are just sufficient to preserve a uniform type of stratification throughout the launder.

Though we have dealt with the theoretical phases of launder separation at considerable length for the purpose of making clear the drawbacks of the prior art and for the purpose of throwing any possible light on the reasons for the success of our method, we do not desire to be limited to any particular theory. The essential thing is that by following the steps as outlined herein, we have been able to attain a separation which is highly selective in comparison with prior art launders.

This application is a division of our application Serial No. 24,654, filed June 3, 1935, on Launder method for separating and sorting materials.

To further illustrate the application of our method, we shall now describe preferred embodiments of apparatus which we have used in performing our process. These embodiments are shown in the accompanying drawings wherein similar characters of reference designate corresponding parts and wherein:

Figure 1 is a perspective view, partially broken away, of a launder designed for the carrying out of our method.

Figure 2 is a longitudinal section of a portion of the launder shown in Figure 1.

Figure 3:
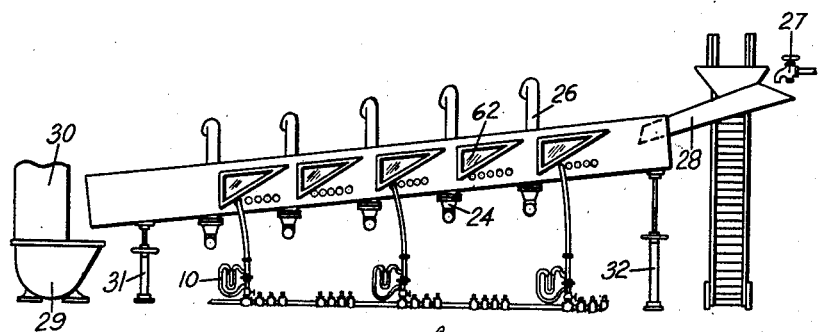
Figure 3 is a side elevation of a launder of somewhat modified form designed for the carrying out of our method.
Figure 4:
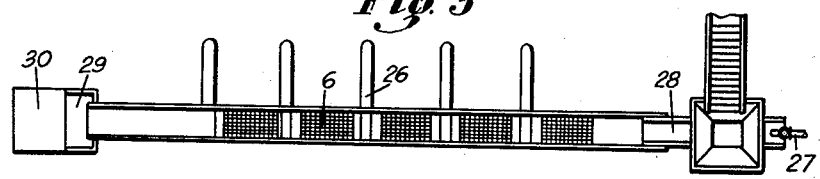
Figure 4 is a plan view of the launder shown in Figure 3.

Referring more particularly to Figures 1 and 2, which show one preferred type of launder, it will be seen that it comprises a series of substantially identical units. One of these units is shown as comprising a base 1 and upstanding end plates 2 and 3. It will be noted that the upstanding end plates 2 and 3 are provided with rearwardly and upwardly inclined extensions 4 and 5.

Disposed in between the extremities of these extensions 4 and 5 are screen plates 6 and 7 which are joined together at their adjacent ends. The screen plate 6 forms the bottom of one pocket of the launder and the screen plate 7 forms the approach to such bottom. Beneath these screen plates are compartments 8 designed to be supplied with water by pipes 9 having gauges 10 associated therewith so that the quantity of water supplied at different sections of the bed may be regulated accurately.

That part of the bed plate which is made up of the screen 6 of each unit is preferably disposed at an angle which may vary between 20° and 40° from the horizontal, depending upon the material being separated and sorted. In the form shown, the angle of the screen 6 is approximately 30° from the horizontal. This is a satisfactory angle for coal ⅜" x 0".

The proper spacing and size of the holes in the screen plate is a matter of importance. The total area of all the holes in the plate per square inch should be such that a slight pressure of 2" to 10" of water gauge is developed beneath the plates. This arrangement accomplishes two purposes. It makes for uniform distribution of the water over the plates and it prevents particles from becoming lodged in the holes. The size of the holes should be as small as is consistent with the proportion of solids and carbonaceous material in the water being used. If clean water is used, 0.02" diameter holes will be satisfactory. If dirty water is being used, holes 0.05" or even larger may be necessary. For ⅜" x 0" coal, we have found that a plate with the holes spaced to give a total opening of 2 per cent of the area of the plate is quite satisfactory.

The compartments 8 are further provided with drainage cocks 11 and with inclined walls 12 that serve to direct any sediment towards the drainage cocks. This is particularly advantageous when relatively dirty water is being introduced into the compartments 8.

It should be understood that the water which is introduced into the compartments 8 passes upwardly through perforations in the screen plates 6 and 7 for the purpose of subjecting the material being separated and sorted to upwardly flowing currents of any desired velocity. These upwardly flowing currents are designed to cooperate with currents which are flowing substantially along the launder, as will be more fully described.

Each pocket is provided with an outlet 13 leading to a draw, which is under the control of an adjustable plate operating in conjunction with an oscillating plate. The adjustable plate comprises a main gate 14 which is pivoted at 15 and which has, slidably mounted thereon, a plate 16 that may be adjusted to vary the available passage through the outlet 13. It may be held in any adjusted position by the ratchet arm 14a cooperating with the arcuate rack 14b.

The oscillatable plate is shown as comprising a main plate 17 which is rigidly secured to a shaft 18 and which carries an extensible plate member 19. The shaft 18 is provided at one end with a crank disk 19a that is slotted for the reception of a crank arm 20, which is adjustable in said slot and which is connected to a pitman 21 whose opposite end is driven by means of the eccentric 22 from the shaft 23. This mechanism operates, during the operation of the launder, to bring about a swinging of the plate 17 as indicated by the arrows in Figure 2.

If desired, the plate 17 may be pivotally mounted at a lower point as shown in Figure 2 and may be supplemented by a rubber apron which may be designated 17a. This manner of mounting of the plate 17 facilitates movement of the lower layers of the bed while the rubber apron precludes the deposit of the minerals in the space between this plate and the partition upon which it is mounted. Any fine materials which may work by the apron 17a are allowed to escape through a space between the pivot axis and the wall of the compartment 8.

Connected to the outlet 13 of each pocket of the launder is a draw 24 which is provided at its lower end with a positively driven screw 25 operating in an upwardly inclined pipe 26 that preferably extends above the top level of the coal and water in the launder, as illustrated in Figure 1.

Another advantageous feature which we have incorporated in all forms of our launder is the provision of transparent wall sections 62. These are illustrated in Figures 1 and 3. One such transparent wall section is provided in one wall of each unit of the trough and it is preferably of such a form that the entire bed in any unit can be viewed therethrough. Glass or other transparent material will serve the purpose.

As shown in Figure 3, a horizontal flow of current along the launder is primarily produced by supplying water to the upper end of the launder through the medium of a faucet 27 which discharges into a feed trough 28 that also receives the coal and in turn empties into the upper end of the launder. It will also be noted, by reference to this figure, that the lower end of the launder is designed to discharge the coarser materials of low specific gravity into the boot 29 of an elevator 30.

Figure 5:
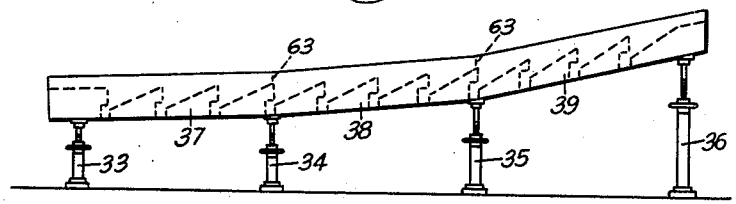
Figure 5 is a side elevation of a modified form of the launder designed for carrying out our method.

In the form shown in Figure 3, the launder is mounted at its end upon adjustable supports 31 and 32, so that the angle of inclination of the launder may be altered by adjustment of the launder as a whole. However, as shown in Figure 5, we may find it desirable to adjust the units of the launder independently. The mechanism for accomplishing this comprises adjustable supports 33, 34, 35 and 36 upon which are mounted sections of the launder 37, 38 and 39, each of these sections embodying a plurality of units.

This embodiment enables us to adjust the angle of the various sections to compensate for the changes in the competent slope in the successive pockets where materials of differing specific gravities are being withdrawn. Any suitable means may be provided for collecting the bottom product from these sections. For example, each section may be built independently with all of the pockets in that one section discharging into one elevator, which would serve the purpose of withdrawing and dewatering the products.

Figure 6:
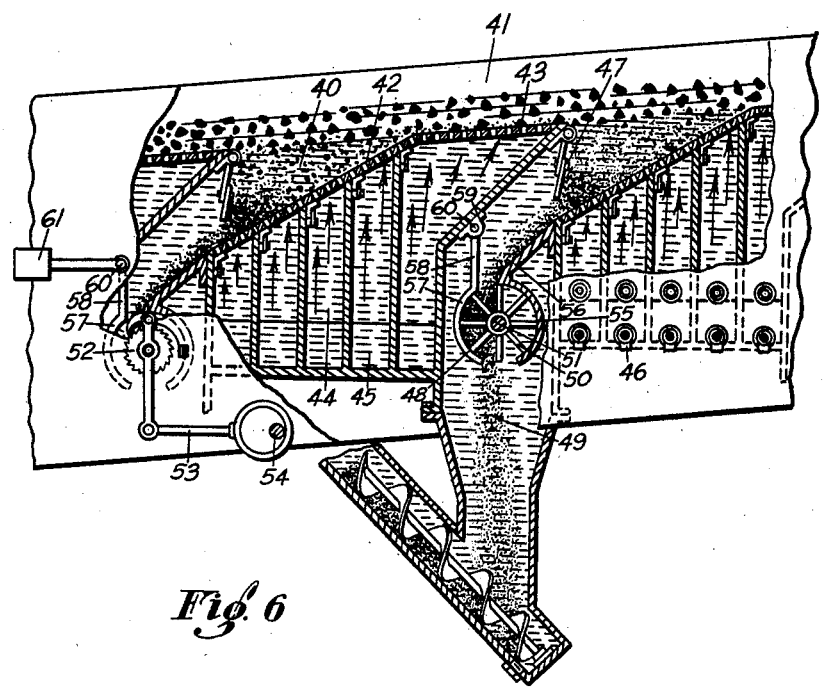
Figure 6 is a longitudinal section of a still further modified launder structure designed for the carrying out of our invention.

A modified form of our apparatus is shown in Figure 6. This modified form of launder is, with a few exceptions, substantially identical with the launders previously described. It comprises a series of pockets which may be generally designated 40 and each of which embodies side walls 41 and an inclined screen plate 42 with a screen plate 43 leading thereto. Water receiving compartments 44 are also provided beneath the screen plates 42 and 43 and these compartments have inclined walls as at 45 for leading the sediment towards clean-out valves 46. An adjustable, pivoted gate 47 is also used at the outlet from each pocket, this gate being of the same structure as that shown at 14 in Figure 1.

Instead of an oscillating plate, such as shown at 17 in Figure 2, we have, in the modified form of Figure 6, shown a controlling wheel 48 which is disposed in the upper portion of each draw 49 to assist in controlling discharge of the refuse from the launder. This wheel 48 is preferably provided with spaced radial blades 50 carried upon a shaft 51 which may be given a step by step rotation by means of a ratchet wheel structure 52, the latter being adjustable in a manner that will be well understood to vary the length of the rotative step. The driving dog and pawl structure of this ratchet is actuated by a pitman 53 which is eccentrically connected to a shaft 54.

A housing for the said wheel 48 is provided by two members. One member comprises a semicylindrical portion 55, whose upper edge is connected by an inclined blade 56 with the lower end of the screen plate 42. The other member comprises a semicylindrical portion 57 whose upper edge is connected to a plate 58 which is rigidly connected as at 59 to a rock shaft 60 which carries a counterweight 61.

In operative position, these two members are so disposed that their semicylindrical portions partially embrace the wheel 48, permitting the refuse to enter at the upper side of the wheel and to discharge at the lower side thereof. Obviously, the step by step rotation of the valve wheel will regulate the discharge of the refuse. The pivoted mounting of the member 58 will permit it to yield against the counterweight to permit the passage of any particle which would otherwise become wedged in and prevent rotation of the valve.

Under certain conditions, it may be desirable to provide one or more vertically adjustable overflow gates at selected intervals along the launder, as illustrated at 63 in Figure 5. These gates may be utilized, as desired, to maintain the proper depth of bed and to insure that there will be no cascading of the liquid into the pockets. These gates may be applied to launders whether their units are relatively adjustable or not and are frequently useful where the angle of the launder does not approximate the angle of complete slope as closely as is desirable.

As explained previously, a certain minimum area of bed surface is essential for efficient separation and the combined areas of the separate compartments should be at least equal to this value. The total amount of area necessary or desirable depends upon the percentage of the high specific gravity material in the feed and upon the difference between the specific gravities of the materials to be separated. Thus, if the percentage of high specific gravity materials is large, the total areas of the bed should be large.

If the difference between the specific gravities of the materials to be separated is small, the total areas should also be large. The areas required may be provided either by the use of a long narrow launder with a large number of pockets or by the use of a relatively short and wide launder with a smaller number of pockets. Our preferred form is short and wide. The successive pockets may be in abutting relation so that the bed presents a continuous surface, or they may be separated and connected by short sections of launder. This latter construction may sometimes be necessary in order to leave sufficient room for the mechanical draws beneath the different pockets. If for any reason it is necessary to make these conduits long they should preferably be provided with upward currents of water to avoid any change in the type of stratification.

Though in the preferred form of our invention the pockets of our launder are in substantially abutting relation, it is within the scope of our invention to provide pockets which are substantially spaced apart with the intermediate connecting portions supplied with upwardly flowing currents of liquid. As a matter of fact, our tests show that pockets of the type which we have shown and claimed will be quite an advance over the prior art, even though they are separated by portions which are not supplied with upwardly flowing currents of liquid, though the efficiency of the launder as a whole may suffer to some extent.

In the operation of our process, water is added from the faucet 27 to the feed to transport the coal to the launder. The proportion of water with the feed in our process should be maintained at a minimum. Thus, for a feed of coal ⅜" x 0" in size with a launder slope of 5° from the horizontal, we have found a 1:1 ratio of water to coal to be satisfactory. The required velocities of the upward streams which enter the bed through the screen plates thereof vary both with the specific gravities of the materials being separated and with the size of the particles. For a certain coal, ⅜" x 0" in size, we have found from 0.0001 to 0.0003 cu. ft. per second per square inch of screen surface to be satisfactory. The amount of water passing into the respective compartments may differ somewhat from this average. For instance, more water may pass upwardly through the downstream compartments than through the upstream compartments.

The regulation of the velocities of the upwardly flowing streams of water and of the velocity of the horizontal stream determines in a large measure, the specific gravity of the particles deposited in a given pocket. Thus, if it is found that small particles of the material of low specific gravity are depositing in the bed, the upward currents of water may be increased slightly to prevent them from depositing. On the other hand, if coarse particles of low specific gravity contaminate the bed, they may be prevented from depositing by decreasing the rate of withdrawal from the pockets.

In starting the launder operation, the end gate 14 is preferably set approximately normal to the slope of the launder as a whole. It is then varied from this position as the operation progresses, these variations depending upon the size of the feed, the rate of withdrawal of the bottom product and the various other factors enumerated above, as indicated by the efficiency of the operation from time to time. Usually, in the final setting, it is sloped so that the bottom edge is downstream with respect to the top edge. One important advantage of this final setting is that the force of the horizontal flow wedges the bed into the pocket and compacts it to give the accentuated condition of crowding and extreme hindered-settling previously discussed.

Though our preferred method of operation calls for the ultimate inclination downstream of the end gates 14, it is possible to operate our apparatus with these end gates disposed in normal positions to the launder. Likewise, it is possible to operate the launder with these end gates disposed normal to the launder at the downstream side of the draw. In these cases the water is adjusted so that the portion of the bed of material in each pocket adjacent the end plate and directly above the entrance to the draw may be maintained completely immobile in a wedge-like form with the point of the wedge directed upstream. The lower surface of this immobile wedge slopes downstream towards the opening to the drawn and forms the upper wall of a passage of progressively decreasing area for the moving bed. In case the end plate is located downstream with respect to the draw, this wedge forms naturally but in case the end plate is upstream from the draw, it is necessary to discharge the water coming from the compartments near the bottom of the screen plate through the draw to effect this result. This manner of accomplishing effects similar to those accomplished by inclining the end gates 14 downstream is within the scope of our invention.

Figure 7:
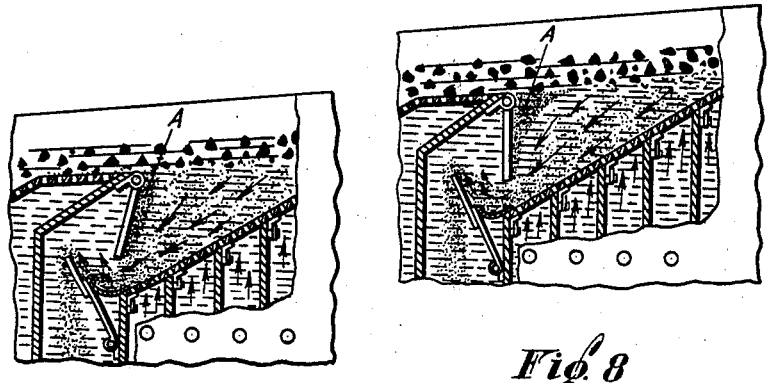
Figure 7 is a more or less diagrammatic illustration of a section of our launder trough, showing the manner in which the inclination of the end gates downstream produces a progressively decreasing channel through which the minerals pass from the pocket to a draw.
Figure 8:
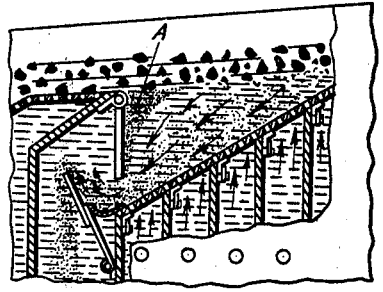
Figure 8 is a more or less diagrammatic illustration showing the end gates vertical and showing the results similar to those attained in the operation of Figure 7 by proper control of the upwardly flowing currents of water.

Figures 7 and 8 illustrate the similarity in the action of the mobile portion of the bed when the end gates 14 are inclined downstream or when these end gates are maintained vertical and the upwardly flowing currents of water are so regulated as to permit building up of the immobile section A of bed above the draw. Substantially this same condition obtains when the end gates are directly above the downstream side of the draw. However, it will be noted that a greater working area in the launder pockets is secured with our preferred method of adjustment wherein the end gate is sloped downstream.

In certain cases, we have found it advantageous to remove some water from the launder with the bottom product and to discharge it through the draw. One way of effecting this is to have the discharge of the draw below the water level in the launder. Most of the water so drawn comes from the lowermost portion of the screen plate of the pocket. It has been found that the further compacting of the topmost layer of the bed resulting from this withdrawal is sometimes beneficial.

Although it is possible to effect a complete separation in one launder, we have found it more practicable to use a primary launder and a secondary launder. On a separation where the materials being treated differ only slightly in specific gravity, as when bone is being separated from coal, the excess of water from the early draws builds up progressively down the launder and increases the difficulty of drawing clean bottom products towards the end of the launder. As a result, we have found it desirable to use two relatively short launders and, towards the end of the first launder, to develop beds of lower specific gravity than desired and even to draw some of the materials of low specific gravity. For example, suppose a separation at 1.50 specific gravity is desired, that is, that the ash content of the clean coal shall equal that of the float on a heavy liquid of 1.50 specific gravity. In such a case, the last draws are set for 1.45 or 1.40 specific gravity separation. The bottom product so drawn is retreated in the auxiliary launder. In re-treatment the horizontal flow can be maintained at a minimum and ample capacity can be provided for the small tonnage to be handled.

While our process and apparatus have been described in particular relation to their use with liquids, they are not limited thereto. Thus, we have found that the process and apparatus will operate in substantially the same manner where the material is caused to travel along the trough by gravity flow while upward currents of air are applied through the apertures in the base of the trough.

Our system, in addition to giving a more efficient separation of the coal from the refuse, has the advantage that it serves as a practical means for compensating for variations in the character of the raw coal coming from the mine. Thus the primary launder can be given a more or less permanent setting, while the variations that occur are passed on to the secondary launder.

This secondary launder will usually have only a few draws and, since all of the separation is visible through the glass windows in the sides, the operator can readily make adjustments in the rate of withdrawal of the refuse to take care of the variation in the mine output. Usually, we find that the amount to be re-treated in the secondary launder constitutes about 10 per cent of the feed, a much smaller amount than the proportion necessarily re-treated in the prior art systems.

Under practically all conditions of operation, we neither advocate nor need any recirculating or stabilizing loads such as are used in the prior art processes. The absence of these is a very great advantage, both from the standpoint of expense and because the attrition and breakage of the coal from rehandling is, in large measure, eliminated from our process.

It will be seen from this that we have provided a novel process and apparatus for separating materials having numerous advantages. For one thing, we have provided such steps and apparatus that, during operation of the launder, the difference between the angle of deposition and competent slope is maintained relatively small while the bed is maintained compact. These factors, together with the uniform and properly distributed upward currents cooperating with the horizontal currents of low volume and velocity result in a markedly improved separation.

The maintenance of a small difference between the angle of deposition and competent slope produces a separation which is more efficient than the prior art separations and this is accentuated by the properly applied and regulated currents. In addition, the compact condition of the bed produces what might be called an extreme hindered-settling action, which makes for more efficient separation.

In addition we have, by utilizing upward currents substantially throughout the launder simultaneously with the horizontal currents, produced a novel type of separation which contributes materially to efficiency. This is in contradistinction to the futile attempts of the prior art to effect horizontal current stratification for long areas of the launder and to intermittently convert to vertical current stratification in inadequate periods of time.

Likewise, we have shown how it is feasible to avoid the use of launders with draw pockets that are relatively widely separated. Thus, we have disclosed a way of avoiding long inactive areas in the launder, so that the launders can be much shortened and yet will have increased efficiency.

As a matter of fact, by the application of upward currents through the bottom of the launder between the draw pockets, we have provided a means for keeping the materials of low specific gravity from depositing in these pockets. Thus, these materials of low specific gravity are kept up within the moving stream both between the draw pockets and above the draw pockets, with consequent improvement in efficiency of separation. Numerous other advantages will also appear from the preceding description and the appended claims.

Though our invention has been described primarily in connection with the separating and the sorting of coal, it will be understood that the principles thereof are applicable to the separating and sorting of ore and other minerals. Such separating and sorting of materials other than coal is within the scope of our invention.

Having thus described our invention, what we claim is:

1. Apparatus for separating and sorting materials comprising an inclined launder along which the materials are carried by a flowing stream of liquid, a plurality of substantially abutting pockets in the base of said launder, each of said pockets being substantially wedge-shaped in vertical longitudinal section so as to compact material which settles therein as it is carried along the launder, each of said pockets having a base which is inclined in a down-stream direction more sharply than the launder as a whole, each of said pockets having an end plate located at the down-stream end of said pocket, said end plate serving to form the wall of said pocket which is opposite the base thereof, said end plate having its lower edge spaced above said inclined base and being adjustable to various angles relative to said base so as to vary the compressing action of the pocket on materials passing thereinto, said end plate being extensible, a draw connected to each of said pockets adjacent the down-stream end of the base thereof, said end plate being located at a point upstream from the lower end of said pocket and from said draw, means for continuously restraining the withdrawal of material from each of said pockets through said draw, said inclined base of each of said pockets being perforated substantially throughout its length, a plurality of independent chambers located directly below said inclined base and having their top wall formed by said inclined base, means for introducing a fluid into the interior of each of said chambers and thence through the perforated base so that it will pass upwardly through the material in said pocket, and means for independently controlling the amount of fluid delivered into each of said chambers.

2. Apparatus for separating and sorting materials comprising an inclined launder along which the materials are carried by a flowing stream of liquid, a plurality of substantially abutting pockets in the base of said launder, each of said pockets being substantially wedge-shaped in vertical longitudinal section so as to compact material which settles therein as it is carried along the launder, each of said pockets having a base which is inclined in a down-stream direction more sharply than the launder as a whole, each of said pockets having an end plate located at the downstream end of said pocket, said end plate serving to form the wall of said pocket which is opposite the base thereof and having its lower edge spaced above said inclined base, said end plate being adjustable to various angles relative to said base so as to vary the compressing action of the pocket on material passing thereinto, a draw connected to each of said pockets adjacent the down-stream end of the base thereof, means for continuously restraining the withdrawal of materials from each of said pockets through said draw, said inclined base of each of said pockets being perforated, a plurality of independent chambers located directly below said inclined base and having their top wall formed by said base, means for introducing a fluid into the interiors of said chambers and thence through the perforated base, and means for independently controlling the amount of fluid delivered through the perforations leading from each chamber.

3. Apparatus for separating and sorting materials comprising an inclined launder along which the materials are carried by a flowing stream of liquid, a plurality of pockets in the base of said launder, each of said pockets being substantially wedge-shaped in vertical longitudinal section so as to compact material which settles therein as it is carried along the launder, each of said pockets having a base which is inclined in a downstream direction more sharply than the launder as a whole, each of said pockets having an end plate located at the down-stream end of said pockets, said end plate serving to form the wall of said pocket which is opposite the base thereof, a draw connected to each of said pockets adjacent the down-stream end thereof, means for continuously restraining the withdrawal of materials from each of said pockets through said draw, said inclined base of each of said pockets being perforated, and means for introducing fluid upwardly through said base, said means being of such a nature that the amount of fluid delivered through said perforated base may be independently controlled at various points along the length thereof.

BYRON M. BIRD.
BERTRAM D. THOMAS.
JOHN W. REA.